(12) United States Patent
Tomberger et al.

(10) Patent No.: US 12,049,204 B2
(45) Date of Patent: Jul. 30, 2024

(54) METHOD AND EQUIPMENT FOR DETERMINING BRAKING-RELEVANT ACTUAL VALUES OF A RAIL VEHICLE FOR THE PERFORMANCE OF CONTROLLED-RETARDATION BRAKING WITH DISTRIBUTED SENSORS

(71) Applicant: KNORR-BREMSE SYSTEME FÜR SCHIENENFAHRZEUGE GMBH, Munich (DE)

(72) Inventors: Christoph Tomberger, Munich (DE); Ulf Friesen, Neubiberg (DE)

(73) Assignee: KNORR-BREMSE SYSTEME FÜR SCHIENENFAHRZEUGE GMBH (DE)

( * ) Notice: Subject to any disclaimer, the term of this patent is extended or adjusted under 35 U.S.C. 154(b) by 451 days.

(21) Appl. No.: 16/643,210

(22) PCT Filed: Aug. 21, 2018

(86) PCT No.: PCT/EP2018/072580
§ 371 (c)(1),
(2) Date: Feb. 28, 2020

(87) PCT Pub. No.: WO2019/042830
PCT Pub. Date: Mar. 7, 2019

(65) Prior Publication Data
US 2020/0207322 A1    Jul. 2, 2020

(30) Foreign Application Priority Data
Aug. 31, 2017 (DE) .................. 10 2017 119 991.8

(51) Int. Cl.
*B60T 13/66* (2006.01)
*B60T 8/17* (2006.01)
(Continued)

(52) U.S. Cl.
CPC .......... *B60T 13/665* (2013.01); *B60T 8/1705* (2013.01); *B60T 8/171* (2013.01); *B60T 8/172* (2013.01); *B60T 13/662* (2013.01); *B60T 17/228* (2013.01)

(58) Field of Classification Search
CPC ...... B60T 13/665; B60T 8/1705; B60T 8/171; B60T 8/172; B60T 13/662; B60T 17/228; B60T 8/3235
See application file for complete search history.

(56) References Cited

U.S. PATENT DOCUMENTS

| | | | | |
|---|---|---|---|---|
| 5,403,073 A | * | 4/1995 | Frank | ....... B60T 8/248 280/446.1 |
| 5,820,226 A | * | 10/1998 | Hart | ....... B60T 8/1893 303/7 |

(Continued)

FOREIGN PATENT DOCUMENTS

| CN | 102333687 A | 1/2012 |
|---|---|---|
| CN | 102431531 A | 5/2012 |

(Continued)

OTHER PUBLICATIONS

International Search Report corresponding to PCT/EP2018/072580, dated Nov. 22, 2018.

*Primary Examiner* — Vivek D Koppikar
*Assistant Examiner* — Godfrey Aleksander Maciorowski
(74) *Attorney, Agent, or Firm* — Barnes & Thornburg LLP

(57) ABSTRACT

A method and equipment determine braking-relevant actual values for a train composed of a plurality of wagons, in particular a rail vehicle, for the performance of controlled-retardation braking of the train, in which at least the longitudinal retardation is taken into account as an actual value, from which, using a retardation controller, in accordance with a predefined target value of a desired break retardation, (Continued)

an actuating value compensating for the control deviation is determined for an actuator of the brake, in that the longitudinal retardation is measured by a plurality of retardation sensors positioned along the train in at least two different wagons to determine the respective local longitudinal retardation, the longitudinal retardation based on the entire train then being calculated as an actual value by a central measured value detection unit.

9 Claims, 2 Drawing Sheets

(51) Int. Cl.
  B60T 8/171 (2006.01)
  B60T 8/172 (2006.01)
  B60T 17/22 (2006.01)

(56) References Cited

U.S. PATENT DOCUMENTS

| | | | | |
|---|---|---|---|---|
| 6,997,520 B1* | 2/2006 | Barberis | ............... | B60T 13/665 |
| | | | | 701/19 |
| 7,810,889 B2* | 10/2010 | Anstey | ................... | B60T 13/66 |
| | | | | 303/7 |
| 8,180,548 B2* | 5/2012 | Cahill | ................... | B60T 8/1703 |
| | | | | 303/138 |
| 9,254,830 B2* | 2/2016 | Schneider | ............. | B60T 17/228 |
| 9,522,667 B2* | 12/2016 | Herden | ................. | B60T 17/228 |
| 10,583,744 B2* | 3/2020 | Müller | .................. | B60T 8/1705 |
| 2008/0128562 A1* | 6/2008 | Kumar | .................... | B61C 17/12 |
| | | | | 246/186 |
| 2012/0136514 A1* | 5/2012 | Noffsinger | .......... | B61L 15/0027 |
| | | | | 701/19 |
| 2012/0192757 A1* | 8/2012 | Schiffers | ............... | B60T 17/228 |
| | | | | 701/19 |
| 2012/0197476 A1* | 8/2012 | Smith | ..................... | B60T 8/885 |
| | | | | 701/24 |
| 2012/0280562 A1* | 11/2012 | Wu | ......................... | B60T 8/174 |
| | | | | 701/77 |
| 2017/0232943 A1* | 8/2017 | Brooks | ................... | G08G 1/22 |
| | | | | 701/19 |

FOREIGN PATENT DOCUMENTS

| | | | |
|---|---|---|---|
| CN | 103204147 A | | 7/2013 |
| CN | 103582588 A | | 2/2014 |
| DE | 4037626 | * | 6/1992 |
| DE | 102015110053 A1 | | 12/2016 |
| EP | 2987694 A1 | | 2/2016 |
| FR | 2942440 A1 | | 8/2010 |
| JP | H06219255 A | | 8/1994 |
| JP | 2009053039 | * | 3/2009 |
| JP | 2014526407 A | | 10/2014 |
| JP | 2014526409 A | | 10/2014 |
| JP | 2019050691 A | * | 3/2019 |
| WO | 2013021012 A1 | | 2/2013 |
| WO | 2013034693 A2 | | 3/2013 |
| WO | 2013034731 A1 | | 3/2013 |

* cited by examiner

METHOD AND EQUIPMENT FOR DETERMINING BRAKING-RELEVANT ACTUAL VALUES OF A RAIL VEHICLE FOR THE PERFORMANCE OF CONTROLLED-RETARDATION BRAKING WITH DISTRIBUTED SENSORS

CROSS REFERENCE AND PRIORITY CLAIM

This patent application is a U.S. National Phase of International Patent Application No. PCT/EP2018/072580 filed Aug. 21, 2018, which claims priority to German Patent Application No. 10 2017 119 991.8, the disclosure of which being incorporated herein by reference in their entireties.

FIELD

Disclosed embodiments relate to a method and a device for determining braking-related actual values of a train assembly consisting of a large number of cars, in particular a rail vehicle, for carrying out deceleration-controlled braking of the train assembly, in which method at least the longitudinal deceleration of the train assembly is taken into account as an actual value from which a manipulated value which compensates for the control deviation is determined for one or more actuators of the brake by a deceleration controller in accordance with a prespecified setpoint value of a desired braking deceleration.

Disclosed embodiments pertain primarily to rail vehicle construction. The train assemblies, which are usually composed of individual cars, must comply with prespecified braking distances when in traffic and, in particular, must come to a stop at points which are signaled to them beforehand. A rail vehicle is braked according to precisely defined criteria, including deceleration characteristics, compliance with which is important for ensuring economical and safe operation of the rail vehicle. Different types of brake are involved in each braking operation of a modern rail vehicle, for example friction brakes, electrodynamic brakes, magnetic rail brakes or eddy current brakes. Each of these brakes has specific advantages, for example a speed or power range in which efficient braking with minimal wear is possible. In this case, each type of brake has specific tolerances and inaccuracies in the application of the braking force, this resulting in undesirable variations in the achieved braking force over the course of braking processes.

SUMMARY

Against this background, the exact metering of braking would require feedback of the actually exerted braking force by communicating this to the vehicle driver via a display in the driver's cab, for example, or supplying it directly to an electronic control loop for the braking force as an actual value. However, especially if a plurality of types of brake interact at the same time, the braking force which is exerted by each individual brake cannot be measured directly, but rather only indirectly with corresponding inaccuracies, for instance via the electrical power consumed, via a brake cylinder pressure or via material expansions. The physical relationship between these variables and the braking force is often not linear and is also subject to systematic and random fluctuations.

Disclosed embodiments provide a method and a device for measured value detection for deceleration control, in particular of a rail vehicle, in a distributed manner, which method/device ensures accurate braking in the case of train assemblies which consist of a plurality of cars.

BRIEF DESCRIPTION OF FIGURES

Measures which improve the disclosed embodiments will be explained in more detail below together with the description of an exemplary embodiment of the disclosed embodiments with reference to the figures, in which.

DETAILED DESCRIPTION

Figure 1:
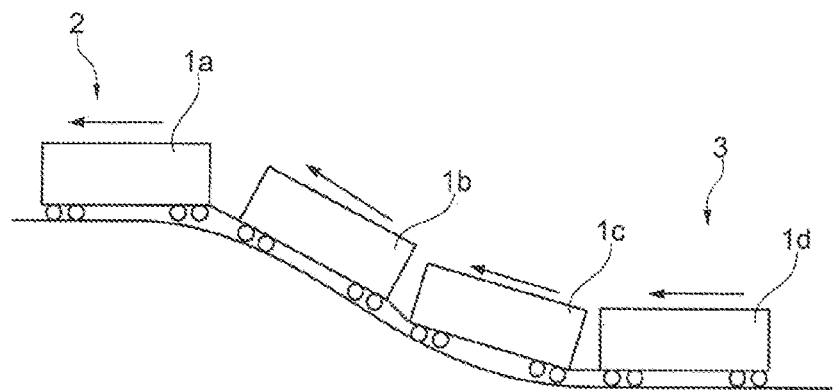
FIG. 1 shows a schematic side view of a train assembly traveling on an upward slope.

Conventionally, DE 10 2011 052 545 A1 discloses a technical solution with which, in order to solve the above-mentioned problem, the values which are representative of the longitudinal deceleration of the vehicle are used as actual values in order to aim for a predefined setpoint values for the longitudinal deceleration of the vehicle via a control loop. Therefore, the effect of braking in the form of a deceleration is controlled at the vehicle level. However, this control does not provide the actually effective braking force. In addition, control to a setpoint value for the longitudinal deceleration of the vehicle has the secondary effect that the topology-induced possible deceleration is not utilized on the upward slope of the route and that the brake is overused on the downward slope of a route.

In order to solve this problem, DE 10 2015 110 053 A1 proposes that, in addition to detecting the longitudinal deceleration which acts on the vehicle, the grade resistance which is caused by an upward slope or downward slope of the route is also determined, with the result that the braking force is calculated on the basis of the longitudinal deceleration of the vehicle and the grade resistance.

The longitudinal deceleration of the vehicle is the kinematic deceleration along the vehicle longitudinal axis. The vehicle longitudinal axis is always parallel to the route, with the result that it tilts with the route during the transition to an upward slope or to a downward slope.

The grade resistance is that force which acts on the vehicle in the direction of travel in the event of an inclination of the route out of the plane, that is to say as a result of an upward slope or downward slope. The vertically downwardly directed weight force of the vehicle in the Earth's gravitational field can be considered to be the vector sum of this grade resistance and a normal force which is perpendicular to the vehicle and is transmitted from the vehicle to the road.

The use of a deceleration sensor, which also statically concomitantly measures the gravitational acceleration for the purpose of determining the longitudinal deceleration of the vehicle, has the advantage that upward slopes and downward slopes do not lead to a change in the sensor signal, with the result that the influence of an upward slope and a downward slope on the longitudinal deceleration of the vehicle is not taken into account. This means that the deceleration of the vehicle which occurs on account of an upward slope, as would also occur during pure rolling, does not occur in the sensor signal. The sensor measures only additional decelerations which occur owing to the braking, for example. If this is not the case, that is to say the deceleration is determined and controlled, for example, on the basis of the vehicle speed, this leads to the braking distance being set independently of upward slopes. This means that the braking distance on the flat is the same length as on upward slopes. This is not desirable since the distant signal distances between the distant signal and the main signal could be matched to the upward slope of the road on the basis of country-specific regulations. In addition, the brake of the vehicle would be released on upward slopes and the vehicle would therefore behave unnaturally. The use of a deceleration sensor for the purpose of determining the longitudinal deceleration of the vehicle during control of the deceleration therefore leads to a desired behavior of the overall system by way of the longitudinal accelerations of the vehicle which occur owing to an upward slope and a downward slope not being taken into account in the actual signal from the deceleration sensor.

In the case of long train assemblies which consist of a large number of individual cars, the braking force can be interpreted differently if the slope of the route changes in the case of a deceleration sensor which is arranged centrally in the train assembly at any desired location, optionally in the lead vehicle, since rear cars of the train assembly can still push or slow down the train assembly. This is because, particularly in the case of long train assemblies and the local downward slope changes which occur in the infrastructure, it is not ensured that all cars of the train assembly are on the same or even only approximately the same downward slope or upward slope at any time. The longitudinal acceleration acting on the rail vehicle on account of the downward slope or upward slope results from the downward slope or upward slope on which each individual car is situated. Each car can be in a different region if the upward slope or downward slope changes.

When crossing a summit for example, the influence of the change in the downward slope on the longitudinal deceleration of the train assembly will vary. This has a decelerating effect on the upward slope. At the summit, in which case the leading car is on the downward slope and the last car is still on the upward slope, the downward slope has no effect whatsoever on the longitudinal deceleration of the train, in the same way as the train is accelerated on the flat and on the subsequent downward slope. If the rail vehicle brakes during a change in the downward slope with an activated deceleration controller, an error between the measured value and the actually expected downward-slope-compensated or upward-slope-compensated deceleration results when measuring the longitudinal deceleration using an acceleration sensor at a central location of the train. This error can lead to a significant extension of the braking distance of the train.

Disclosed embodiments include the technical teaching that the longitudinal deceleration is measured by a plurality of deceleration sensors, which are positioned along the train assembly in at least two different cars, for determining the respectively local longitudinal deceleration, wherein the longitudinal deceleration which relates to the entire train assembly is calculated as an actual value by a central measured value detection unit.

In other words, the actual value, which is the basis for the deceleration control, is calculated not only from a centrally arranged measurement source for the current deceleration of the rail vehicle but rather from a plurality of deceleration sensors which are placed in a distributed manner along the rail vehicle. In this case, the actual value is calculated from the individual measurement signals which are obtained in a distributed manner Additional or supplementary calculation steps can likewise be taken into account when calculating the actual value, such as for example longitudinal tilt, which is ascertained by measurement or derived by calculation, of the rail vehicle, for example for the purpose of checking plausibility. Furthermore, it is also possible to check the plausibility of the sensor signals for improved fault identification. In this case, the calculated actual value has a higher value the greater the number of deceleration sensors there are distributed along the rail vehicle, wherein one deceleration sensor for each car of the train assembly represents the maximum achievable accuracy. In order to achieve the advantages associated with the solution according to the disclosed embodiments, it is also conceivable for a deceleration sensor to be arranged at least in the first car and in the last car of the train assembly. The solution according to the disclosed embodiments is suitable, in particular, in the case of long rail vehicles with a large number of cars which run on routes with significant changes in gradient.

According to a further measure which improves the disclosed embodiments, it is proposed that the deceleration sensors which are arranged in a distributed manner over the train assembly are connected to the central measured value detection unit via a data bus line which is looped through all cars of the train assembly, which measured value detection unit is optionally located in the frontmost train part, for example the lead vehicle. By way of using a data bus, the number of switched-on deceleration sensors can be configured in a flexible manner depending on the number of coupled cars.

FIG. 1 shows a train assembly which consists of a large number of cars $1a$ to $1d$ and is in the form of a rail vehicle. The individual direction of travel is assigned to each of the cars $1a$ to $1d$ using a vector arrow. Accordingly, the train assembly is traveling on an upward slope, in the case of which the car $1a$ of the frontmost train part 2 has currently reached the maximum height, while the middle cars $1b$ and $1c$ are on an upward slope and the car $1d$ which forms the rearmost train part 3 is still at the beginning of the upward slope.

Figure 2:
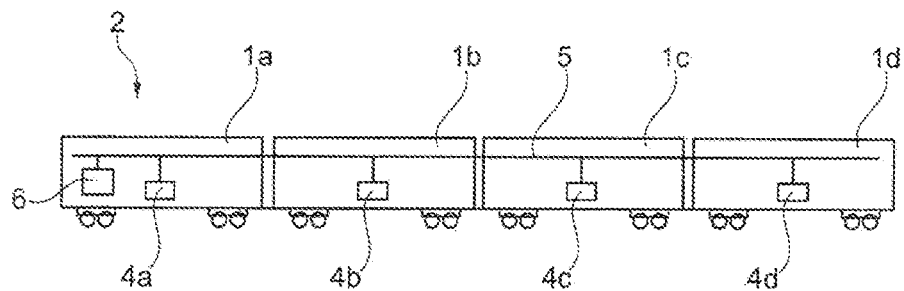
FIG. 2 shows a schematic side view of the train assembly according to FIG. 1 with deceleration sensors, which are arranged in a distributed manner along the train length, according to a first embodiment.

FIG. 2 shows the train assembly which consists of the cars $1a$ to $1d$ and has a device, which is integrated in the train assembly, for determining braking-related actual values. For the purpose of measuring the longitudinal deceleration, each of the cars $1a$ to $1d$ has arranged in it an associated deceleration sensor $4a$ to $4d$. Each deceleration sensor $4a$ to $4d$ measures the car-related longitudinal deceleration, which can vary depending on the degree of increase. All deceleration sensors $4a$ to $4d$ are connected to a central measured value detection unit 6 via a data bus line 5 which is looped through all cars $1a$ to $1d$ of the train assembly and is located in a central position in the frontmost train part 2 here.

Figure 3:
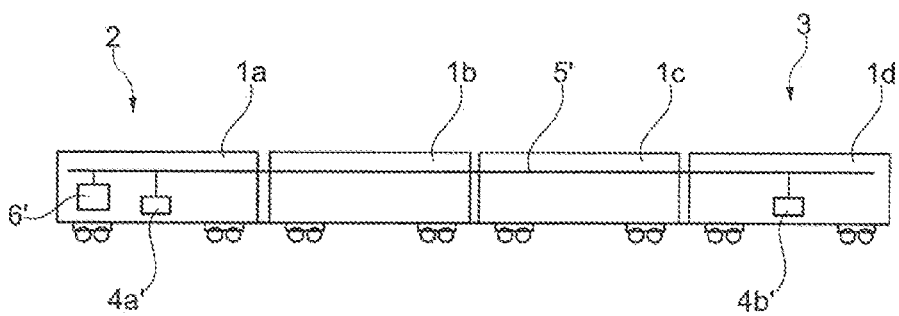
FIG. 3 shows a schematic side view of the train assembly according to FIG. 1 with deceleration sensors, which are arranged in a distributed manner along the train length, according to a second embodiment.

According to FIG. 3, in contrast to the exemplary embodiment described above, a deceleration sensor $4a'$ and, respectively, $4b'$ is in each case arranged only in the first car $1a$ and in the last car $1d$ of the train assembly. Therefore, the local longitudinal deceleration is determined in the region of the frontmost train part 2 and of the rearmost train part 3. The measured value signals are also connected to a central measured value detection unit $6'$ via a data bus line $5'$ which is looped through all cars $1a$ to $1d$ of the train assembly here.

Figure 4:
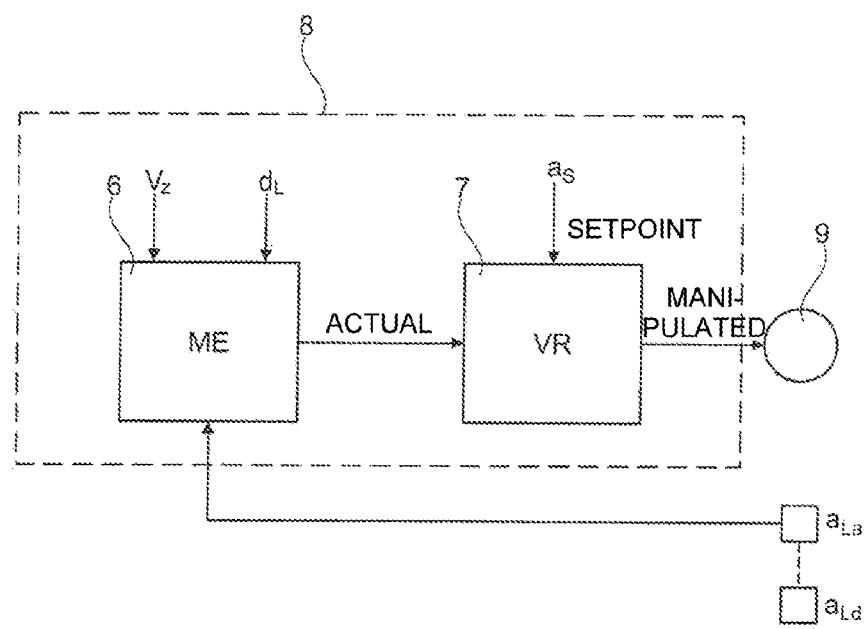
FIG. 4 shows a block diagram of a deceleration control arrangement.

According to FIG. 4, a deceleration controller 7 is associated with the measured value detection unit 6, which deceleration controller serves to carry out the deceleration-controlled braking of the train assembly, wherein both physical units are arranged in a manner integrated in a controller unit 8. The controller unit 8 is arranged in the frontmost train part 2—not illustrated further here—of the train assembly, optionally integrated in the electronic brake control unit.

The longitudinal decelerations $a_{La}$ to $a_{Ld}$ which are determined by the plurality of deceleration sensors—not illustrated further here—are fed to the input end of the central measured value detection unit 6. For the purpose of checking plausibility or the like, other measured values, for example a measured value of the longitudinal tilt $\alpha_L$ and the speed $v_Z$ of the rail vehicle, are also passed to the measured value detection unit 6. The actual value which is determined by the measured value detection unit 6 on the basis of the measurement variables is used by a downstream deceleration controller 7 to calculate, for deceleration/deceleration force control by comparison with a prespecified setpoint value of a desired braking deceleration, the resulting control deviation and prespecifies the control deviation to an actuator 9 of the brake, for example to a pressure control valve for operating a pneumatic brake cylinder, in the form of a manipulated value as an actuating signal.

The disclosed embodiments are not restricted to the exemplary embodiments described above. Rather, modifications thereof which are concomitantly included in the scope of protection of the following claims are also conceivable. For example, it is also possible to use actuators other than a pneumatic brake for the deceleration-controlled braking operation, for example an electrodynamic brake, an eddy current brake or the like can also be actuated in this way.

LIST OF REFERENCE SIGNS

1 Car
2 Frontmost train part
3 Rearmost train part
4 Deceleration sensor
5 Data bus line
6 Measured value detection unit
7 Deceleration controller
8 Controller unit
9 Actuator
$a_L$ Longitudinal deceleration
$\alpha_L$ Longitudinal tilt
$v_Z$ Speed
$a_S$ Setpoint value (for deceleration control)

The invention claimed is:

1. A method for determining braking-related actual values of a train assembly including a plurality of cars for carrying out deceleration-controlled braking of the train assembly, the method comprising:
measuring longitudinal deceleration ($a_L$) by a plurality of deceleration sensors positioned along the train assembly in at least two different cars, the longitudinal deceleration sensors producing signals that are unaltered by upward or downward slopes;
determining respectively local longitudinal deceleration ($a_{La-d}$);
calculating the longitudinal deceleration ($a_L$) that relates to the entire train assembly as an actual value by a central measured value detection unit based on the respectively determined local longitudinal deceleration of the at least two different cars; and
determining, by a deceleration controller, a manipulated value which compensates for a control deviation for an actuator of the brake, wherein the determination takes into account at least the longitudinal deceleration ($a_L$) as an actual value from which the manipulated value is determined in accordance with a prespecified setpoint value of a desired braking deceleration.

2. The method of claim 1, further comprising calculating the longitudinal deceleration ($a_L$) which relates to the entire train assembly from the local longitudinal deceleration ($a_{La-d}$) by calculating a mean value.

3. The method of claim 1, wherein a longitudinal tilt ($a_L$) which is determined by measurement or derived by calculation and/or the speed ($v_Z$) of the train assembly are/is also taken into account when calculating the braking-related actual value for the deceleration-controlled braking.

4. A device for determining braking-related actual values of a train assembly including a plurality of cars for carrying out deceleration-controlled braking of the train assembly while taking into account at least longitudinal deceleration ($a_L$) as an actual value, the device comprising:
a deceleration controller which outputs a manipulated value which compensates for the control deviation for an actuator of the brake based on longitudinal deceleration ($a_L$) in accordance with a prespecified setpoint value ($a_S$) of a desired braking deceleration;
a plurality of deceleration sensors, which are positioned along the train assembly in at least two different cars for measuring longitudinal deceleration ($a_L$) to determine respectively local longitudinal deceleration ($a_{La-d}$), the longitudinal deceleration sensors producing signals that are unaltered by upward or downward slopes; and
a central measured value detection unit calculates the longitudinal deceleration ($a_L$) which relates to the entire train assembly as an actual value based on the respectively determined local longitudinal deceleration of the at least two different cars.

5. The device of claim 4, wherein at least one deceleration sensor of the plurality of deceleration sensors is arranged the in each car of the train assembly.

6. The device of claim 4, wherein at least one deceleration sensor of the plurality of deceleration sensors is arranged the in the first car (1*a*) and in the last car (1*d*) of the train assembly.

7. The device of claim 4, wherein the plurality of deceleration sensors are connected to the central measured value detection unit via a data bus line which is looped through all cars of the train assembly.

8. A train assembly including a plurality of cars and having a device for determining braking-related actual values of the train assembly for carrying out deceleration-controlled braking of the train assembly while taking into account at least longitudinal deceleration ($a_L$) as an actual value, the device comprising:
a deceleration controller which outputs a manipulated value which compensates for the control deviation for an actuator of the brake based on longitudinal deceleration ($a_L$) in accordance with a prespecified setpoint value ($a_S$) of a desired braking deceleration;
a plurality of deceleration sensors, which are positioned along the train assembly in at least two different cars for measuring longitudinal deceleration ($a_L$) to determine respectively local longitudinal deceleration ($a_{La-d}$); the deceleration sensors producing signals that are unaltered by upward or downward slopes, and
a central measured value detection unit calculates the longitudinal deceleration ($a_L$) which relates to the entire train assembly as an actual value based on the respectively determined local longitudinal deceleration of the at least two different cars, wherein the measured value detection unit and the deceleration controller are integrated in a controller unit arranged in the frontmost train part.

9. A non-transitory computer readable medium including computer program code for carrying out a method for determining braking-related actual values of a train assembly including a plurality of cars for carrying out deceleration-controlled braking of the train assembly when the computer program code runs on an electronic device, the method comprising:

measuring longitudinal deceleration ($a_L$) by a plurality of deceleration sensors positioned along the train assembly in at least two different cars, the measured longitudinal deceleration producing signals that are unaltered by upward or downward slopes;

determining respectively local longitudinal deceleration ($a_{La-d}$);

calculating the longitudinal deceleration ($a_L$) that relates to the entire train assembly as an actual value by a central measured value detection unit based on the respectively determined local longitudinal deceleration of the at least two different cars; and determining, by a deceleration controller, a manipulated value which compensates for a control deviation for an actuator of the brake, wherein the determination takes into account at least the longitudinal deceleration ($a_L$) as an actual value from which the manipulated value is determined in accordance with a prespecified setpoint value of a desired braking deceleration.

* * * * *